(12) United States Patent
Farn et al.

(10) Patent No.: US 8,702,011 B2
(45) Date of Patent: Apr. 22, 2014

(54) BARCODE STRUCTURE AND BARCODE ENCODING METHOD

(71) Applicant: Industrial Technology Research Institute, Hsin-Chu (TW)

(72) Inventors: En-Jung Farn, Hsinchu (TW);
Chih-Wei Chen, New Taipei (TW);
Chung-Chia Kang, Tainan (TW);
Nien-Chu Wu, Taoyuan County (TW)

(73) Assignee: Industrial Technology Research Institute, Hsin-Chu (TW)

( * ) Notice: Subject to any disclaimer, the term of this patent is extended or adjusted under 35 U.S.C. 154(b) by 0 days.

(21) Appl. No.: 13/743,172

(22) Filed: Jan. 16, 2013

(65) Prior Publication Data

US 2014/0042232 A1 Feb. 13, 2014

(30) Foreign Application Priority Data

Aug. 10, 2012 (TW) .............................. 101128945 A (51) Int. Cl.
*G06K 19/06* (2006.01)

(52) U.S. Cl.
USPC .......................................... 235/494; 235/454

(58) Field of Classification Search
USPC ................ 235/494, 454, 460, 462.07, 462.03
See application file for complete search history.

(56) References Cited

U.S. PATENT DOCUMENTS

| | | | |
|---|---|---|---|
| 5,869,828 A | 2/1999 | Braginsky | |
| 6,793,138 B2 | 9/2004 | Saito | |
| 7,751,585 B2 | 7/2010 | Jancke | |
| 7,823,797 B2 | 11/2010 | Ming | |
| 8,006,911 B2 | 8/2011 | Lee et al. | |
| 2004/0065739 A1 | 4/2004 | Sang et al. | |
| 2006/0255163 A1 | 11/2006 | Bian | |

(Continued)

FOREIGN PATENT DOCUMENTS

| | | |
|---|---|---|
| CN | 2357370 Y | 1/2000 |
| CN | 1674043 A | 9/2005 |

(Continued)

OTHER PUBLICATIONS

M.Querini, e tal., 2D Color Barcodes for Mobile Phones, International Journal of Computer Science and Applications, 2011, vol. 8(1), pp. 136-155.

(Continued)

*Primary Examiner* — Edwyn Labaze
(74) *Attorney, Agent, or Firm* — Morris Manning & Martin LLP; Tim Tingkang Xia, Esq.

(57) ABSTRACT

A barcode structure includes at least one symbolic element row and a frame arranged at a periphery of the at least one symbolic element row. Each symbolic element row has multiple symbolic elements. Each symbolic element has different color from its adjacent symbolic elements, and the color of the frame is different from that of any symbolic element. A barcode encoding method includes: establishing multiple color combinations where a color of a frame is excluded, and each color combination comprising a main color and a sub color; performing a symbolic element row establishment procedure, which includes using a reference color as a color of a first symbolic element of a symbolic element row; deleting color combinations where the reference color is used as a main color; and selecting a color combination from remaining color combinations for coloring two symbolic elements that are sequentially connected with the first symbolic element.

14 Claims, 5 Drawing Sheets

(56) References Cited

U.S. PATENT DOCUMENTS

| | | |
|---|---|---|
| 2007/0278303 A1 | 12/2007 | Cattrone |
| 2008/0035730 A1* | 2/2008 | Look .................. 235/462.07 |
| 2009/0242641 A1 | 10/2009 | Blasczak |
| 2009/0289120 A1 | 11/2009 | Hanson |
| 2010/0155479 A1 | 6/2010 | Ming |
| 2010/0282851 A1 | 11/2010 | Bulan et al. |
| 2010/0327066 A1 | 12/2010 | Khan |
| 2011/0000958 A1 | 1/2011 | Herzig |
| 2011/0079639 A1 | 4/2011 | Khan |
| 2011/0082747 A1 | 4/2011 | Bhat et al. |

FOREIGN PATENT DOCUMENTS

| | | | |
|---|---|---|---|
| CN | 1845124 | A | 10/2006 |
| CN | 101149813 | A | 3/2008 |
| CN | 101515335 | A | 8/2009 |
| CN | 201283707 | Y | 8/2009 |
| CN | 101996336 | A | 3/2011 |
| TW | 200820087 | A | 5/2008 |
| TW | 200939170 | A | 9/2009 |

OTHER PUBLICATIONS

Pei, et al., Codec System Design for Continuous Color Barcode Symbols, IEEE 8th International Conference on Computer and Information Technology Workshops, 2008, DOI 10.1109/CIT.2008.Workshops.9, pp. 539-544.

Grillo, et al., High Capacity Colored Two Dimensional Codes, Proceedings of the Internaional Multiconference on Computer Science and Information Technology, 2010, pp. 709-716.

Parikh et al., Localization and Segmentation of a 2D High Capacity Color Barcode, IEEE Workshop on Applications of Computer Vision, 2008, pp. 1-6.

* cited by examiner

BARCODE STRUCTURE AND BARCODE ENCODING METHOD

CROSS-REFERENCE TO RELATED APPLICATION

This application claims the benefit of Taiwan Patent Application No. 101128945, filed on Aug. 10, 2012, which is hereby incorporated by reference for all purposes as if fully set forth herein.

TECHNICAL FIELD

The present disclosure relates to a barcode technology, and more particularly to a barcode structure and a barcode encoding method.

BACKGROUND

In recent years, a two-dimensional barcode has been widely used in varieties of applications. For example, in the advertising and marketing, the two-dimensional barcode is adopted to store a coupon link website, in a personal business card, the two-dimensional barcode is adopted to store an e-mail address or twitter/facebook link, in merchandise, the two-dimensional barcode is adopted to store introduction web pages of the merchandise, and in a ticketing system, the two-dimensional barcode is adopted to store a single ticket. Most of the above applications are restricted by the capacity of the two-dimensional barcode, and only single website link or single ticket can be stored. The phenomenon results in that the two-dimensional barcode cannot exist independently, an additional auxiliary media is needed to explain content of the two-dimensional barcode, for example, in the advertising and marketing, a text is required to explain that the two-dimensional barcode is used to download the coupon, and the ticket needs to have an additional information text to indicate which activity the ticket is used for. Thus, larger storage space is needed, for example: information about personal biological characteristics, and fingerprints and iris features; storing multiple types of information in a single barcode, for example: a barcode on a business card stores an e-mail address, a telephone number, twitter/face book, and address information at the same time; and a security mechanism is added to the content of the barcode, for example: an authentication mechanism is added to a ticket, a password needs to be input to learn activity information corresponding to the ticket, and even if lost, the stolen ticket cannot be used by others. Many other applications are restricted by the capacity problem and thus cannot be implemented.

As a camera carried in a smart phone is highly developed, the two-dimensional barcode also evolves to a color age. Adding color information highly increases the capacity of the barcode, so that the applications of the barcode can be more diversified.

SUMMARY

In an embodiment, a barcode structure is provided, which comprises at least one symbolic element row and a frame. The at least one symbolic element row corresponds to the number of bits of encoded information, each symbolic element row comprises multiple symbolic elements, the multiple symbolic elements extend and are sequentially connected in a first direction, each symbolic element comprises a polygon, and each symbolic element has different color from its adjacent symbolic elements. The frame enables the at least one symbolic element row to be arranged in the frame. The frame has a color different from that of any symbolic element.

In another embodiment, a barcode encoding method is further provided, which comprises following steps: deciding multiple colors according to the number of bits of encoded information; deciding a frame, and deciding a color of the frame from the multiple colors; removing the color of the frame from the multiple colors, two different colors among remaining colors forming a combination, so as to establish a first color lookup table comprising multiple color combinations, and each color combination comprising a main color and a sub color different from the main color; and performing a symbolic element row establishment procedure, which further comprises following steps: deciding a reference color from the remaining multiple colors, which is used as a color of a first symbolic element of a symbolic element row, where the symbolic element comprising a polygon; deleting combinations where the reference color is used as a main color in the first color lookup table, so as to form a second color lookup table; and selecting a color combination corresponding to content of the encoded information from the second color lookup table, which is respectively used colors of two symbolic elements that extend and are sequentially connected with the first symbolic element in a first direction, so as to form the symbolic element row in the frame.

In another embodiment, in each symbolic element row, two adjacent symbolic elements form a group, and extension directions of any two side edges of adjacent symbolic elements of the group are used to add an information amount stored by two bits.

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION OF THE DISCLOSURE

Technical measures used by the present disclosure to achieve the objective and effects are described below with reference to accompanying drawings, following embodiments provided through the drawings are merely for description, so as to enable auditors to have better understanding, and the technical measures of the present disclosure are not limited to the provided drawings.

The following embodiments include a barcode structure and a barcode encoding method, so as to improve barcode capacity to a great extent, store multiple different types of information at the same time, and guarantee that a barcode can be read quickly and correctly. In addition, in the barcode structure of the following embodiments, a color of any symbolic element is definitely different from a color of an adjacent symbolic element, so high robustness is achieved with respect to geometric distortion such as twisting and rotation.

Figure 1:
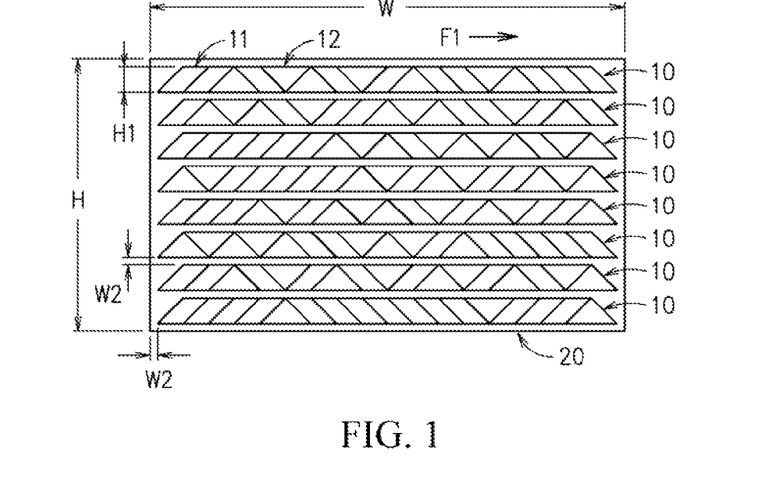
FIG. 1 is a schematic structural diagram of a barcode according to an embodiment of the present disclosure.
Figure 2:
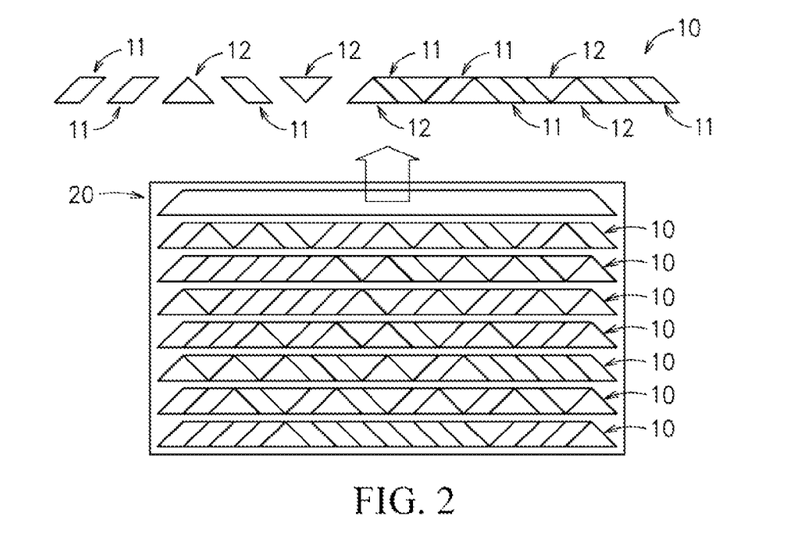
FIG. 2 is a schematic structural diagram of a symbolic element row and a frame according to an embodiment of the present disclosure.

Referring to FIG. 1 and FIG. 2 for a structure of an embodiment of a barcode provided by the present disclosure, the barcode 100 includes multiple symbolic element rows 10 and a frame 20, the multiple symbolic element rows 10 are arranged in the frame 20, each symbolic element row 10 is formed by arranging and combining multiple symbolic elements 11 and symbolic elements 12 that extend and are sequentially connected in a first direction F1, and the symbolic element row 10 has a length. Each symbolic element row 10 has a first height H1. Adjacent side edges of two adjacent symbolic elements have a same length. The multiple symbolic elements 11 and symbolic elements 12 each are of a polygonal structure, for example, a parallelogram and triangle, each symbolic element 11 or 12 has a color, and two adjacent symbolic elements have different colors.

The frame 20 also has a color, and the color of the frame 20 is different from that of any symbolic element. It should be noted that, the frame 20 in this embodiment is a frame used to define a size of the barcode structure, and thus has a certain size, and the size of the frame is decided according to sizes and the number of the symbolic element rows. In addition, the frame in another embodiment may not be a physical boundary that defines the size of the barcode structure 100, but be a physical or virtual border frame formed by using a color different from that of any symbolic element for separation. A user may also define a range of the frame as required.

Figure 3:
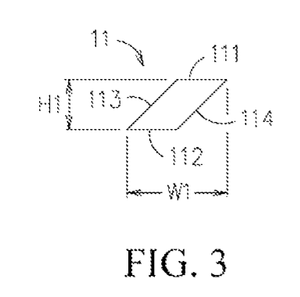
FIG. 3 is a schematic structural diagram of a first symbolic element according to an embodiment of the present disclosure.

Referring to FIG. 3, in an embodiment, a symbolic element 11 is a parallelogram, the symbolic element 11 has a first side edge 111, a second side edge 112, a third side edge 113, and a fourth side edge 114. The first side edge 111 and the second side edge 112 are two side edges opposite to each other, and the first side edge 111 and the second side edge 112 are parallel to each other and are parallel to the first direction F1 (as shown in FIG. 1). The third side edge 113 and the fourth side edge 114 are two side edges opposite to each other, and the third side edge 113 and the fourth side edge 114 are parallel to each other. The symbolic element 11 has a first height H1 (namely, a perpendicular distance between the first side edge 111 and the second side edge 112) and a first width W1, and in this embodiment, the first height H1 is equal to half of the first width W1, which is not limited here.

Figure 4:
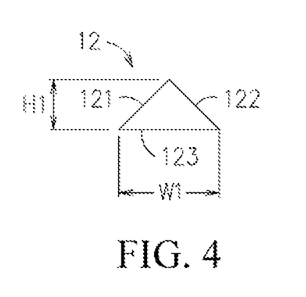
FIG. 4 is a schematic structural diagram of a second symbolic element according to an embodiment of the present disclosure.

Referring to FIG. 4, in another embodiment, a symbolic element 12 is a triangle, and the symbolic element 12 has a fifth side edge 121, a sixth side edge 122, and a seventh side edge 123. The seventh side edge 123 is arranged between the fifth side edge 121 and the sixth side edge 122, the seventh side edge 123 is parallel to the first direction F1 (as shown in FIG. 1), and the fifth side edge 121 and the sixth side edge 122 are symmetrically arranged, so that the symbolic element 12 is in a shape of an isosceles triangle. A height of the symbolic element 12 (namely, a perpendicular distance from a connection point of the fifth side edge 121 and the sixth side edge 122 to the seventh side edge 123) is equal to the first height H1, and a width of the symbolic element 12 (namely, a length of the seventh side edge 123) is equal to the first width W1.

Figure 5:
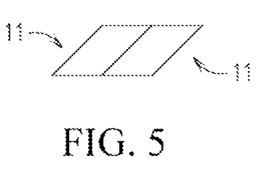
FIG. 5 to FIG. 8 are schematic structural diagrams of combinations of a first symbolic element and a second symbolic element according to an embodiment of the present disclosure.
Figure 6:
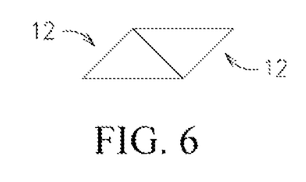
Figure 7:
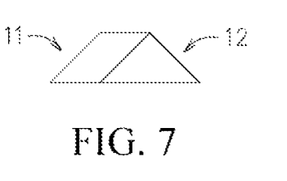
Figure 8:
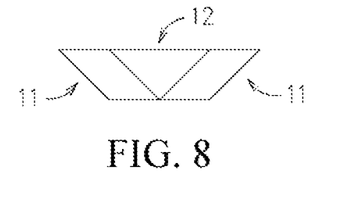

Based on the above size design of the symbolic element 11 being a parallelogram and the symbolic element 12 being a triangle, the adjacent side edges of two adjacent symbolic elements have the same length and a same extension direction, so symbolic elements 11 and symbolic elements 12 can be randomly combined and sequentially connected. Referring to FIG. 5 to FIG. 8, two symbolic elements 11 can be adjacently arranged (as shown in FIG. 5), two symbolic elements 12 can be adjacently arranged in an upside down manner (as shown in FIG. 6), a symbolic element 11 and a symbolic element 12 can be adjacently arranged (as shown in FIG. 7), and two symbolic elements 11 can be symmetrically arranged at two sides of a symbolic element 12 and are upside-down (as shown in FIG. 8), so multiple symbolic elements 11 and symbolic elements 12 can be randomly combined and arranged in the first direction F1. As shown in FIG. 1, each symbolic element row 10 has a different manner of arranging the symbolic elements 11 and the symbolic elements 12, but each symbolic element row 10 has the same first height H1 and a same arrangement direction parallel to the first direction F1.

Figure 9:
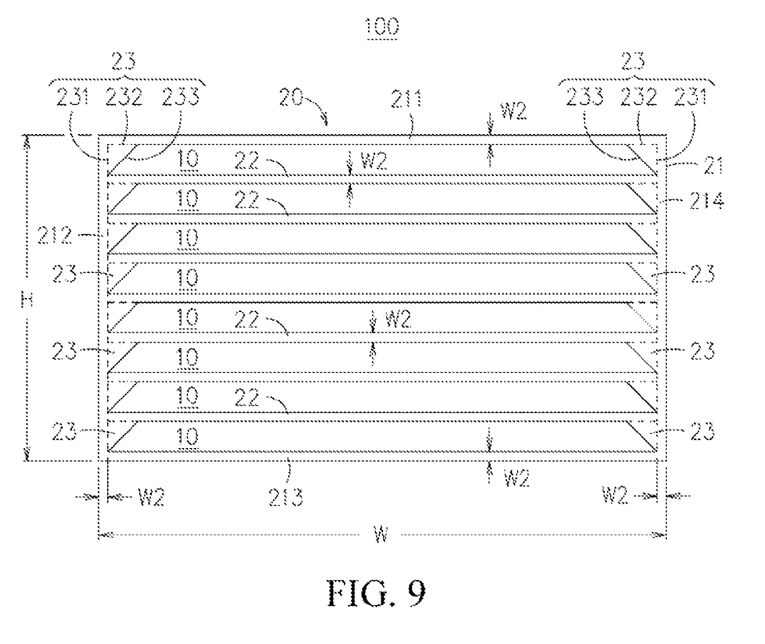
FIG. 9 is a schematic structural diagram of a barcode frame according to an embodiment of the present disclosure.

Referring to FIG. 1, FIG. 2, and FIG. 9, the multiple symbolic element rows 10 are arranged in the frame 20 and in the first direction F1. The frame 20 does not store any information, and the frame 20 is used for positioning and as a demarcation line. The frame 20 includes a rectangular rim frame 21, the rim frame 21 has a width W and a height H, the rim frame 21 is arranged at a periphery of the multiple symbolic element rows 10, the rim frame 21 includes four border frames 211 to 214, and the four border frames 211 to 214 each have a same width W2, which is not limited. A demarcation line 22 is arranged between two vertically adjacent symbolic element rows 10, and the demarcation line 22 has the same width W2 as the four border frames 211 to 214, which is not limited. In addition, in this embodiment, each symbolic element row 10 is a flat trapezoid having an upper base shorter than a lower base in the first direction F1, so the frame 20 further includes multiple triangle block groups, each symbolic element row 10 is correspondingly provided with a triangle block group, the triangle block group includes two triangle blocks 23, the two triangle blocks 23 are symmetrically arranged at two opposite ends of the symbolic element row 10, the triangle block 23 is a right triangle, and each of the triangle blocks 23 has two sides 231 and 232 that are perpendicular to each other and a hypotenuse 233.

Based on the above design of the symbolic element row 10 and the frame 20, a pattern of the barcode 100 shown in FIG. 1 can be formed, the barcode 100 has a width W and a height H, each symbolic element row 10 has a first height H1, and the first height H1 is the height of the first symbolic element 11 and the second symbolic element 12. For example, a size calculation formula of the barcode 100 is as follows:

the width $W$ of the barcode 100=[(the number of the symbolic elements of each symbolic element row+1)*(the width $W1$ of the symbolic element/2)]+2*(the width $W2$ of the border frame); and the height $H$ of the barcode 100=(the height $H1$ of the symbolic element row+1)*(the number of the symbolic element rows)+(the width $W2$ of the border frame)*(the number of the symbolic element rows+1).

For the embodiment shown in FIG. 1, the barcode 100 has 8 symbolic element rows, and each symbolic element row 10 has 17 symbolic elements. Assuming that the width W1 is 10 units, the first height H1 is 5 units, and the width is 1.5 units, the width $W$ of the barcode 100=[(17+1)*(10/2)]+2*(1.5)=93 units; and the height $H$ of the barcode $100=(5+1)*(8)+(1.5)*(8+1)=61.5$ units.

In the foregoing barcode structure, triangles and parallelograms are used as symbolic elements of a color barcode, so cases of using the four types of symbolic elements, a boundary between symbolic elements has two different directions, such as a side edge 116 from upper left to lower right and a side edge 115 from upper right to lower left. When the foregoing side edges of two directions are used as boundaries, the directions of the boundaries can be used to store a bit.

Taking FIG. 7 as an example, assuming that N colors and 2 symbolic elements 11 and 12 are used to generate a color barcode, a separate color used as a background color of the frame cannot be the same as colors of adjacent symbolic elements, and is deducted, so each symbolic element can use N−2 colors. In the present disclosure, two symbolic elements are used as a unit to store information, so color information can totally store $\log_2 ((N-2)^2)$ bits. Two symbolic elements has three boundaries, but two symbolic elements share each boundary, so actually only two boundaries can be used to store information, and each boundary has two directions and can store a bit. Therefore, each two symbolic elements can store $\log_2 ((N-2)^2)+2$ bits. Data of the total number of bits that can be stored by the whole barcode structure is shown as follows:

the actual number of bits that can be stored=the number of the symbolic element rows*((the number of the symbolic elements of each symbolic element row−1)/2)*($\log_2$((the number of the used colors−2)$^2$)+2).

In addition to the above feature of the symbolic element shapes and sizes, another feature of the barcode provided by the present disclosure lies in color arrangement. As described above, two adjacent symbolic elements definitely have different colors, and are directly connected without adding an additional demarcation. In this way, a maximum number of symbolic elements can be configured in a limited area, and the capacity of the barcode structure for storing information can be increased. In addition, the color of the frame is definitely different from those of all symbolic elements. Based on the number of the symbolic elements of the barcode, the number of the symbolic element rows, the number of the used colors, and side edges of two adjacent symbolic elements, the actual number of bit the barcode can store can be decided, namely, an encoding principle of the barcode of the present disclosure.

A barcode encoding method of the present disclosure is described below. First, the number of used colors and a size of each symbolic element are decided. In this embodiment, eight colors are used, and each symbolic element has a width of ten pixels and a height of five pixels. Next, a proper barcode size is selected according to the number of bits of original information. If the number of bits of the original information the selected barcode size can store is larger than the number of bits of current original information, zeros are added behind the current original information until the number of bits are consistent with the number of the bits the selected barcode size can store. Next, an error-correcting code is generated, and stringed with filling information, the number of bits of the error-correcting code depends on a length of the original information and a fault tolerance rate of the barcode, and the filling information is bits used to supplement a length of the encoded information. The fault tolerance rate is decided by a designer, and may be set to, for example, 30%. According to the number of bits of the foregoing encoded information, a form is shown as follows:

| Original information | 00...0 | Error-correcting code | Filling information |

Next, the number of the used colors is decided according to the frame color and the number of bits of the encoded information. In this embodiment, the length of the encoded information is assumed to be 7 bits, so 8 colors can be used to form a barcode structure. In this embodiment, eight colors of red, green, blue, magenta, yellow, light blue, while, and black are used, any one of the eight colors is selected as the color of the frame 20, and the frame 20 does not store any information. For example, the black can be selected as the color of the frame 20. Next, in the seven colors of red, greed, blue, magenta, yellow, light blue, and white, two colors form a color combination, so as to establish a first color lookup table shown as follows.

First Color Lookup Table

| Red\green | Red\blue | Red\magenta | Red\yellow | Red\light blue | Red\white |
|---|---|---|---|---|---|
| Green\red | Green\blue | Green\magenta | Green\yellow | Green\light blue | Green\white |
| Blue\red | Blue\green | Blue\magenta | Blue\yellow | blue\light blue | Blue\white |
| Magenta\red | Magenta\green | Magenta\magenta | Magenta\yellow | Magenta\light blue | Magenta\white |
| Yellow\red | Yellow\green | Yellow\blue | Yellow\magenta | Yellow\light blue | Yellow\white |
| Light blue\red | Light blue\green | Light blue\blue | Light blue\magenta | Light blue\yellow | Light blue\white |
| White\red | White\green | White\blue | White\magenta | White\yellow | White\light blue |

The above first color lookup table includes multiple color combinations, each color combination includes a main color and a sub color different from the main color, for example, in a first row, the red is the main color, and the green, blue, magenta, yellow, light blue, and white are sub colors; in a second row, the green is the main color, and the red, blue, magenta, yellow, light blue, and white are sub colors, and so on.

Figure 10A:
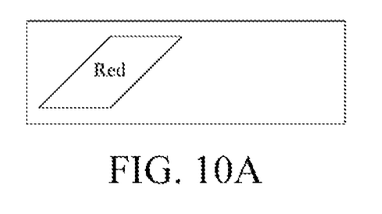
FIG. 10A to FIG. 10D are schematic diagrams of a barcode encoding manner according to an embodiment of the present disclosure.

Next, a reference color among the multiple colors is decided to be used as a color of a first symbolic element, and the symbolic element includes a polygon. As shown in FIG. 10A, the color of the first symbolic element of a symbolic element row is decided, which is red in this embodiment. In this embodiment, the reference color of the first symbolic element does not store information. Next, color combinations where the reference color is used as the main color in the first color lookup table are removed, so as to obtain a second color lookup table, the second color lookup table includes at least one color combination, and each color combination represents a set of color bit information. For example, in this embodiment, the reference color is the red, so the color combinations (shown in a following table) where the red is used as the main color in the first color lookup table are deleted:

| Red\green | Red\blue | Red\magenta | Red\yellow | Red\light blue | Red\white |
|---|---|---|---|---|---|

After the deletion, the second color lookup table is formed. Next, required color bit information is correspondingly arranged in the modified first color lookup table, for example, five bits are needed to store colors, which means that the bits are $00000_2$ to $11111_2$, so $00000_2$ to $11111_2$ are arranged in the modified first color lookup table in sequence from left to right and from top to bottom, so as to obtain a modified second color lookup table as follows:

Second Color Lookup Table:

| Green\red $00000_2$ | Green\blue $00001_2$ | Green\magenta $00010_2$ | Green\yellow $00011_2$ | Green\light blue $00100_2$ | Green\white $00101_2$ |
|---|---|---|---|---|---|
| Blue\red $00110_2$ | Blue\green $00111_2$ | Blue\magenta $01000_2$ | Blue\yellow $01001_2$ | Blue\light blue $01010_2$ | Blue\white $01011_2$ |
| Magenta\red $01100_2$ | Magenta\green $01101_2$ | Magenta\blue $01110_2$ | Magenta\yellow $01111_2$ | Magenta\light blue $10000_2$ | Magenta\white $10001_2$ |
| Yellow\red $10010_2$ | Yellow\green $10011_2$ | Yellow\blue $10100_2$ | Yellow\magenta $10101_2$ | Yellow\light blue $10110_2$ | Yellow\white $10111_2$ |
| Light blue\red $11000_2$ | Light blue\green $11001_2$ | Light blue\blue $11010_2$ | Light blue\magenta $11011_2$ | Light blue\yellow $11100_2$ | Light blue\white $11100_2$ |
| White\red $11110_2$ | White\green $11111_2$ | White\blue | White\magenta | White\yellow | White\light blue |

The above second color lookup table includes multiple color combinations, and each color combination represents a set of color bit information. For colors adopted in this embodiment, as eight colors are used, after the color used by the frame and a color of a reference symbol are deducted, each two symbolic elements can store information of $\log_2((8-2)^2)+2=7$ bits, where the color can store $\log_2((8-2)^2)+2=5$ bits. It should be noted that, in the above second color lookup table, four color combinations of [white\blue], [white\magenta], [white\yellow], and [white\light blue] do not have corresponding bits, as the five bits are used up. If to cover the four color combinations of [white\blue], [white\magenta], [white\yellow], and [white\light blue], one more bit should be added, but in this case, as no other corresponding color combinations exist, the bit is dummy. A designer can decide the required number of bits according to an actual situation.

Figure 10B:
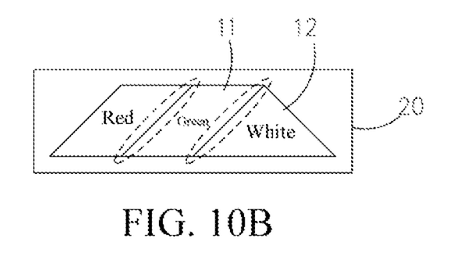

Next, as shown in FIG. 10B, in the second color lookup table, corresponding colors are selected as colors of two symbolic elements, that are sequentially connected with the first symbolic element, according to bit combinations. For example, if to represent information of $0010111_2$, first five codes can select the color combination of green\white as colors of next two symbolic elements. For information of last two codes 11, any two adjacent side edges of three side edges of two adjacent symbolic elements can be used to store two-bit side edge bit information. In this embodiment, bit information is defined according to a trend of a side edge, for example, a side edge with a direction from upper left to lower right represents 0, and a side edge with a direction from upper right to lower left represents 1. Taking FIG. 10B as an example, left side edges of a symbolic element 11 and a symbolic element 12 (in positions that are marked by dotted ellipses) are used to store bits, the two side edges have a trend from upper right to lower left, so represented bits are 11. It should be noted that, though the frame is generated in a procedure at beginning in this embodiment, the generation of the frame is not limited by the order, and the frame and the corresponding frame color can be generated after symbolic element rows are generated.

Figure 10C:
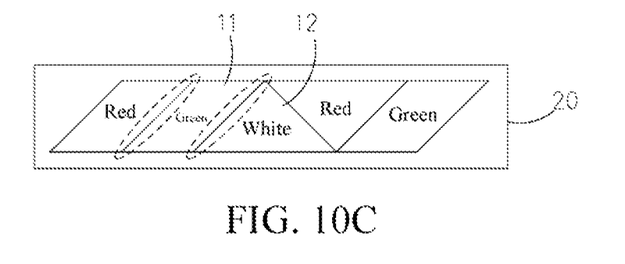

In addition, as shown in FIG. 10C, if to increase a length of a symbolic element row, a color of a last symbolic element 12 may be used as a reference color, which is the white in this embodiment, and then the color combinations corresponding to the white and in the first color lookup table are deleted, so as to form another second color lookup table.

Another Second Color Lookup Table

| Green\red $00000_2$ | Green\blue $00001_2$ | Green\magenta $00010_2$ | Green\yellow $00011_2$ | Green\light blue $00100_2$ | Green\white $00101_2$ |
|---|---|---|---|---|---|
| Blue\red $00110_2$ | Blue\green $00111_2$ | Blue\magenta $01000_2$ | Blue\yellow $01001_2$ | Blue\light blue $01010_2$ | Blue\white $01011_2$ |
| Magenta\red $01100_2$ | Magenta\green $01101_2$ | Magenta\blue $01110_2$ | Magenta\yellow $01111_2$ | Magenta\light blue $10000_2$ | Magenta\white $10001_2$ |
| Yellow\red $10010_2$ | Yellow\green $10011_2$ | Yellow\blue $10100_2$ | Yellow\magenta $10101_2$ | Yellow\light blue $10110_2$ | Yellow\white $10111_2$ |
| Light blue\red $11000_2$ | Light blue\green $11001_2$ | Light blue\blue $11010_2$ | Light blue\magenta $11011_2$ | Light blue\yellow $11100_2$ | Light blue\white $11100_2$ |
| Red\green | Red\blue | Red\magenta | Red\yellow | Red\light blue | Red\white |

Figure 10D:
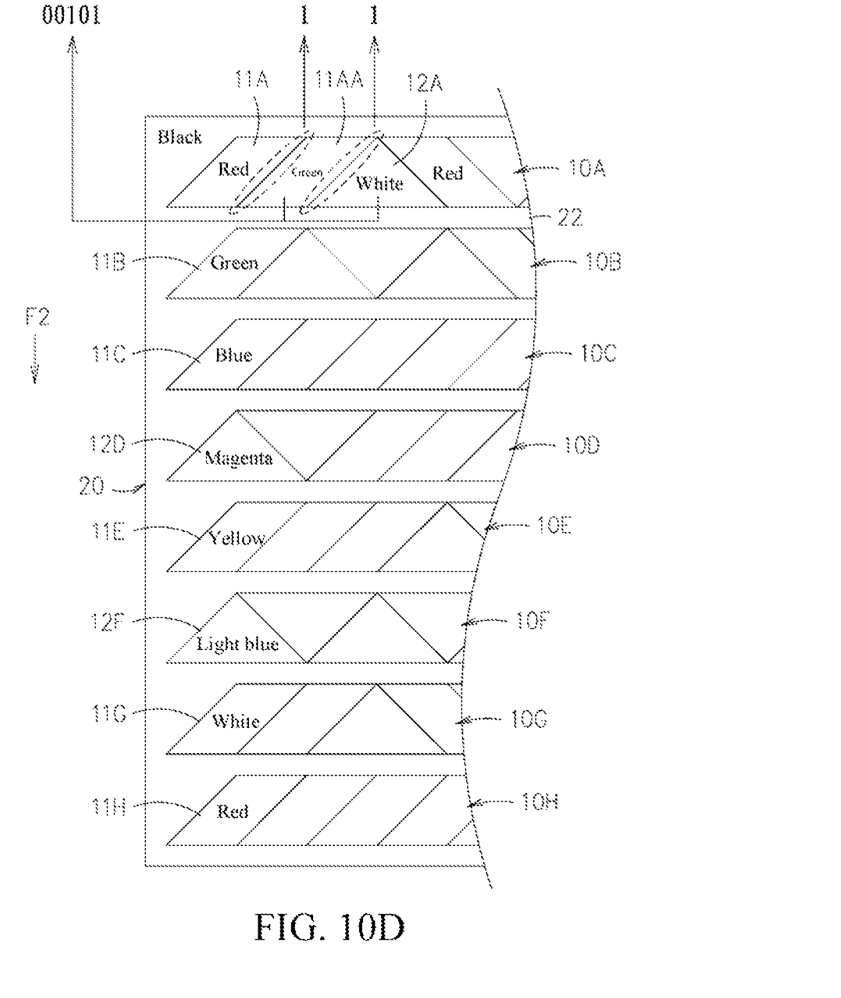

Next, a color combination corresponding to bits to be represented is selected from the second color lookup table, which is respectively used as colors of two symbolic elements that extend and are sequentially connected with the last symbolic element in the symbolic element row in the first direction, so as to extend the length of the symbolic element row, and therefore increase an information amount stored by the symbolic element row. Execution is repeated in the same manner, symbolic element rows with different lengths can be generated as required. In addition, it should be noted that, the above describes a manner of generating a single symbolic element row, and for multiple symbolic element rows, as shown in FIG. 10D, in a generation manner of each row, the above steps can be repeated, second row to eighth symbolic element rows 10B to 10H continue to be encoded, until all information is completely encoded, so as to form a barcode structure of multiple symbolic element rows that are arranged in a second direction F2, and a demarcation line 22 exists between adjacent symbolic element rows. Taking a symbolic element row 10A in FIG. 10D as an example, a first symbolic element 11A in a leading position is a reference symbol, and does not store information, a color combination of a first symbolic element 11AA and a second symbolic element 12A is [green/white], and left side edges of the first symbolic element 11AA and the second symbolic element 12A each have a direction from upper right to lower left, represented bit information is $0010111_2$, first five bits are color bit information, which can be learned by referring to the second color lookup table, and last two bits are side edge bit information, which together form original information of encoded information. Similarly, when the first symbolic element 11AA and the second symbolic element 12A of the barcode are read, it can be determined that the represented original information is $0010111_2$ according to the color combination [green/white] of the first symbolic element 11AA and the second symbolic element 12A and the trend of the left side edges of the first symbolic element 11 AA and the second symbolic element 12A.

Thus, the actual number of bits the barcode provided by the present disclosure can store may be indicated by a following formula:

the actual number of bits that can be stored=the number of the symbolic element rows*(the number of the symbolic elements of each symbolic element row−1)/2)*($\log_2$((the number of the used colors−$2)^2)+2$).

For the embodiment of FIG. 1, the actual number of bits the barcode 100 can store=$8*(17/2)*(\log_2((8-2)^2)+2)=476$.

In addition, it should be noted that, though in the foregoing embodiments, a color combination is a combination with two different colors, the color combination may also be a combination of more than three different colors according to the spirit. In the combination with more than three different colors, a manner of establishing a first color lookup table and a second color lookup table is the same as that in the above method. If it is a color combination of three different colors, the first symbolic element is sequentially connected with three following symbolic elements each time, and if it is a color combination of four different colors, the first symbolic element is sequentially connected with four following symbolic elements each time, and so on.

Based on features of the encoding method with respect to an encoding format in the present disclosure, quick positioning and reading of a barcode are facilitated:

1. As the frame color is only used for positioning and by a demarcation line, in the first step of detecting a barcode position, the frame color can be used for distinction, for example, the frame is black, and thus black/non-black filtering can be directly performed. Next, the number of black pixels of each symbolic element row is calculated, and a histogram is drawn by using statistical data. A row corresponding to each peak is a demarcation line. In this way, a location of each symbolic element row can be correctly positioned.

2. For each symbolic element row, a side edge detection method (for example, the Sobel Edge Detection) may be used to detect a direction of a side edge, a color of each triangle or parallelogram may be determined according to a color of a most central pixel, then be compared with a reference color to obtain most similar color, and reference may be made to the method for details.

To sum up, in the barcode structure and the barcode encoding method provided by the present disclosure, triangles and parallelograms are used as symbolic elements, and the encoding format is different from that of a conventional two-dimensional barcode. In the present disclosure, it is only required to vertically separate symbolic elements, instead of laterally separating symbolic elements. In the present disclosure, in addition to that information is stored through colors of the symbolic elements, information may also be stored through a side edge between symbolic elements. Therefore, the present disclosure, while improving the barcode capacity to a great extent and meanwhile storing multiple different types of information, can further guarantee that the barcode can be quickly and correctly read.

The disclosure being thus described, it will be obvious that the same may be varied in many ways. Such variations are not to be regarded as a departure from the spirit and scope of the disclosure, and all such modifications as would be obvious to one skilled in the art are intended to be included within the scope of the following claims.

What is claimed is:

1. A barcode structure, comprising:
    at least one symbolic element row, wherein the number of rows corresponds to the number of bits of encoded information, each symbolic element row comprises multiple symbolic elements, the multiple symbolic elements extend and are sequentially connected in a first direction, each symbolic element comprises a polygon, and any two adjacent symbolic elements have different colors; and
    a frame, wherein the at least one symbolic element row is arranged in the frame, and a color of the frame is different from that of any symbolic element,
    wherein the frame comprises:
    a rim frame, arranged at a periphery of the at least one symbolic element row, wherein the rim frame comprises four border frames; and
    at least one triangle block group, comprising two triangle blocks, wherein the two triangle blocks are symmetrically arranged at two ends of the at least one symbolic element row in the first direction.

2. The barcode structure according to claim 1, wherein one of the symbolic elements is a parallelogram.

3. The barcode structure according to claim 1, wherein one of the symbolic elements is a triangle.

4. The barcode structure according to claim 1, comprising multiple symbolic element rows, wherein the multiple symbolic element rows are parallel to the first direction and arranged in the frame, and each symbolic element row is correspondingly provided with a triangle block group.

5. The barcode structure according to claim 4, wherein the frame further comprises at least one demarcation line between two adjacent symbolic element rows.

6. The barcode structure according to claim 1, wherein in each symbolic element row, two adjacent symbolic elements form a group, and extension directions of any two side edges of adjacent symbolic elements of the group are used to store information.

7. A barcode encoding method, comprising following steps:
    deciding multiple colors according to the number of bits of encoded information;
    deciding a frame, and deciding a color of the frame from the multiple colors;
    removing the color of the frame from the multiple colors, two different colors among remaining colors forming a combination, establishing a first color lookup table comprising multiple color combinations, and each color combination comprising a main color and a sub color different from the main color; and
    performing a symbolic element row establishment procedure, which further comprises following steps:
    deciding a reference color from the remaining multiple colors, which is used as a color of a first symbolic element of a symbolic element row, wherein the symbolic element comprising a polygon;
    deleting combinations in which the reference color is used as a main color in the first color lookup table, so as to form a second color lookup table; and
    selecting a color combination corresponding to content of the encoded information from the second color lookup table, which is respectively used as colors of two symbolic elements that extend and are sequentially connected with the first symbolic element in a first direction, so as to form the symbolic element row in the frame.

8. The barcode encoding method according to claim 7, further comprising repeating the symbolic element row establishment procedure for multiple times, so as to obtain multiple symbolic element rows arranged along a second direction, wherein a demarcation line exists between two adjacent symbolic element rows.

9. The barcode encoding method according to claim 7, further comprising following steps:
    deleting color combinations, in which a color of a last symbolic element in a symbolic element row being a main color, from the first color lookup table, so as to form another second color lookup table; and selecting any one color combination from the second color lookup table, which is respectively used as colors of two symbolic elements that extend and are sequentially connected in the first direction with the last symbolic element in the symbolic element row, so as to extend a length of the symbolic element row, and increase an information amount the symbolic element row is capable of storing.

10. The barcode encoding method according to claim 7, wherein in the symbolic element row, two adjacent symbolic elements form a group, and extension directions of any two side edges of adjacent symbolic elements of the group are used to store information.

11. The barcode encoding method according to claim 7, wherein the encoded information comprising original information, and an error-correcting code and at least one piece of filling information that follow the original information, the number of bits of the error-correcting code depends on a length of the original information and a fault tolerance rate of the barcode, and the filling information is used to supplement a length of the encoded information.

12. The barcode encoding method according to claim 7, wherein the frame comprises:
   a rim frame, arranged at a periphery of the at least one symbolic element row, wherein the rim frame comprises four border frames; and
   at least one triangle block group, comprising two triangle blocks, wherein the two triangle blocks are symmetrically arranged at two ends of the at least one symbolic element row in the first direction.

13. The barcode encoding method according to claim 7, wherein one of the symbolic elements is a parallelogram.

14. The barcode encoding method according to claim 7, wherein one of the symbolic elements is a triangle.

* * * * *